United States Patent [19]

Tanner

[11] Patent Number: 4,587,745

[45] Date of Patent: May 13, 1986

[54] BERRY DRYING APPARATUS

[76] Inventor: Lincoln L. Tanner, Box 177, Brunswick, Ga. 31520

[21] Appl. No.: 718,440

[22] Filed: Apr. 1, 1985

[51] Int. Cl.$^4$ .............................................. F26B 17/18
[52] U.S. Cl. ......................................... 34/95; 34/130; 34/135; 34/142; 209/288
[58] Field of Search ................. 34/130, 135, 138, 142, 34/95; 198/676; 209/238, 288, 293; 432/108

[56] References Cited

U.S. PATENT DOCUMENTS

| 106,147 | 8/1870 | Frank et al. | |
|---|---|---|---|
| 299,683 | 6/1884 | Sawin . | |
| 534,491 | 8/1894 | Atwood . | |
| 565,522 | 8/1896 | Stucky . | |
| 892,901 | 7/1908 | Schwartz | 34/135 |
| 921,631 | 3/1908 | da Silveira e Paulo . | |
| 1,122,651 | 8/1913 | Shortt . | |
| 1,500,974 | 7/1924 | Webster . | |
| 1,912,414 | 6/1933 | Tobey . | |
| 2,527,826 | 10/1950 | Kooman | 34/130 |
| 2,707,339 | 5/1955 | Berge | 34/130 |
| 3,051,311 | 8/1962 | Dettling | 209/288 |
| 3,058,830 | 10/1962 | Christianson | 34/130 |
| 3,501,848 | 3/1970 | Massey | 34/138 |
| 3,645,010 | 2/1972 | Korekawa | 34/133 |

FOREIGN PATENT DOCUMENTS

| 75247 | 6/1949 | Norway | 209/288 |
|---|---|---|---|
| 400381 | 4/1974 | U.S.S.R. | 209/288 |
| 682284 | 8/1979 | U.S.S.R. | 209/288 |

Primary Examiner—Albert J. Makay
Assistant Examiner—David W. Westphal
Attorney, Agent, or Firm—Jones & Askew

[57] ABSTRACT

An apparatus for drying fruits, berries, and the like, including a helical drum for supporting berries in its interior. Each turn of the helical drum is in parallel spaced-apart relation to the adjacent turns, and the spacing between turns is smaller than the diameter of the fruits or berries being dried. The drum is mounted on a frame for rotation about its longitudinal axis, and a fan is mounted inside the helical drum to provide a drying current of air outwardly between the turns of the drum. Berries which are introduced into the interior of the drum are supported between and on the turns of the helix, and as the drum rotates, the berries are moved down the drum and through the drying current of air.

8 Claims, 3 Drawing Figures

BERRY DRYING APPARATUS

TECHNICAL FIELD

This invention relates generally to apparatus for drying agricultural commodities or the like, and more specifically relates to a berry drying apparatus having a rotating helical drum whose coils are spaced apart by a distance less than the diameter of the berries. The berries are supported inside the helical drum by the coils of the helix and carried through the dryer by the rotation of the drum. An air blower mounted inside the drum dries the berries by creating a stream of air moving past the berries as they travel through the dryer.

BACKGROUND OF THE INVENTION

Fruits, berries, and other agricultural commodities which are packed while moist are susceptible to premature spoilage Accordingly, it is necessary to avoid picking berries or similar commodities while wet, or to dry the commodities before they are packed. For example, if blueberries are subjected to continuous rainfall during the time for picking, these berries normally could not be picked and fresh-packed.

Blueberries are delicate and must be handled carefully and dried quickly to prevent bruising and spoilage. Heat should not be used in the drying process, as it hastens the deterioration of the berries.

Apparatus for drying berries and other fruits is known in the art. One such example is shown in U.S. Pat. No. 1,912,419, which discloses a dryer having a rotary drum mounted for rotation on a horizontal axis. A helical track mounted on the inner surface of the drum moves the fruit through the drum as the drum rotates. A moving stream of air and absorbent material on the inner surface of the drum dry the fruit. U.S. Pat. No. 565,522 discloses a drum dryer for flour or grain including an open-ended perforated outer cylinder and a fan mounted in the end of the drum to draw air through the drum. The drying action of these dryers is relatively slow, notwithstanding the perforated drying drums used therein.

SUMMARY OF THE INVENTION

As will be seen, the berry dryer of the present invention overcomes these and other problems associated with prior art dryers. Stated generally, the berry drying apparatus of the present invention includes a helical drum mounted for rotation about its longitudinal axis on a support frame. Fruits or berries are introduced into the interior of the drum where they are supported between and on the coils of the helical drum and as the helix rotates, the fruits or berries move through the drum. A fan is mounted inside the drum to provide a drying current of air blowing outwardly past the berries and through the spaces between the coils.

Stated more specifically, the berry dryer of the present invention includes a metal drum in the shape of a helix mounted for rotation about its longitudinal axis. Each turn of the helix is spaced apart from adjacent turns by a distance less than the diameter of a berry. Berries are introduced into the interior of the helix, where they are supported by the drum in the tracks or grooves between turns of the wire. An air blower mounted inside the drum creates a stream of air moving past the berries and through the openings between coils to the outside. As the wire drum rotates, the berries are turned gently through the stream of air, and thus are dried as they are moved down the dryer. Additionally, stems and trash which are removed from the berries as they are tumbled through the airstream fall between the coils and out of the dryer, rather than being carried along through the dryer and expelled along with the berries.

Thus, it is an object of the present invention to provide an improved drying apparatus for berries, fruits and the like.

It is a further object of this invention to provide a dryer having maximum openings between the interior of the dryer and the surrounding environment for improved drying efficiency.

It is yet another object of this invention to provide a berry drier which removes trash, stems, and debris which fall off the berries during the drying process, rather than retaining this debris in the dryer to recontaminate the berries.

Other objects, features and advantages of the present invention will become apparent upon reading the following specifications when taken in conjunction with the drawings and the appended claims.

DETAILED DESCRIPTION OF THE DISCLOSED EMBODIMENT

Figure 1:
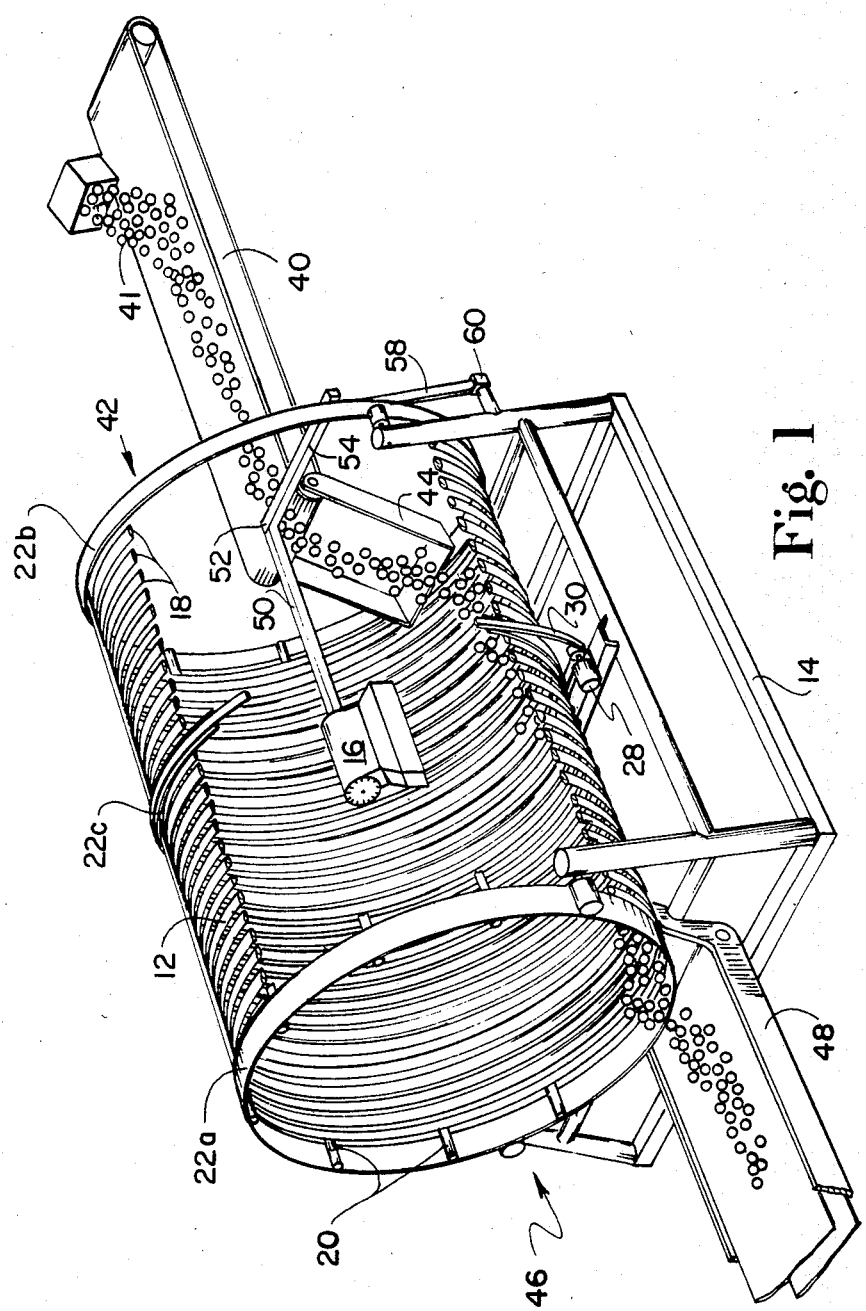
FIG. 1 shows a pictorial view of the preferred embodiment of the berry dryer of the present invention.
Figure 3:
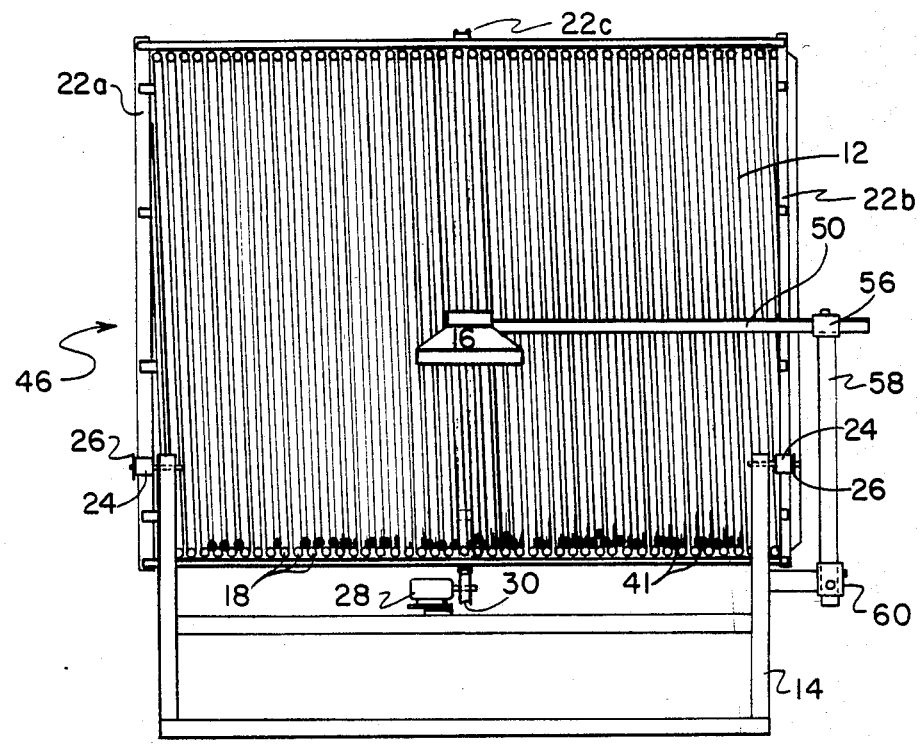
FIG. 3 shows a side cross-sectional view of the berry dryer taken along line 3—3 of FIG. 2.
Figure 2:
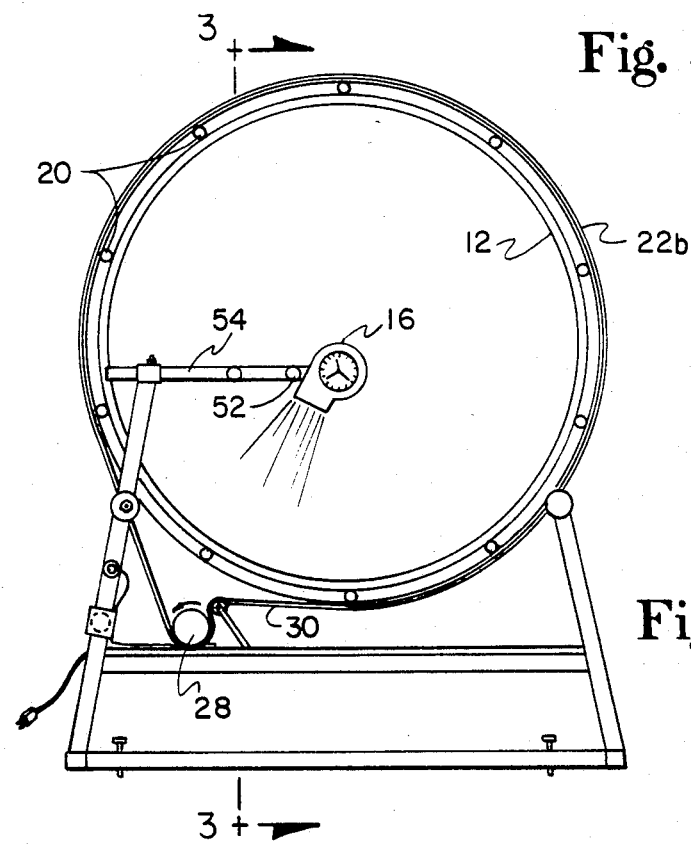
FIG. 2 shows an end view of the berry dryer of FIG. 1.

Referring now in more detail to the drawing, in which like numerals indicate like elements throughout the several views, FIGS. 1-3 show a berry dryer 10 including a helical drum 12 mounted on a substantially horizontal axis, support frame 14 for supporting and rotating the helical drum, and fan 16 located within the drum. The helical drum 12 consists of metal spiral coils or turns 18, each turn being in parallel, spaced apart relation to the adjacent turns. To prevent berries from falling between the turns of the drum helix, the spacing between adjacent turns cannot exceed the diameter of the berries to be dried. While the dryer of the preferred embodiment is intended for processing blueberries and the like, it will be appreciated that other fruits may similarly be dried, and that the proportions between adjacent turns of the helix may be increased accordingly so long as the spacing does not exceed the diameter of the fruit The turns 18 of the helical drum 12 are fabricated of wire and held in place in this spaced apart relation by longitudinal bracing members 20 disposed about the outer circumference of the helical drum 12. The longitudinal bracing members 20 of the preferred embodiment are ten steel rods spaced equally around the outer circumference of the helix and spot welded to each of the turns of the drum. It will be appreciated by those skilled in the art that alternative methods of affixing the turns to the bracing members may be employed, such as adhesives.

End bands 22a, 22b and center band 22c are circumferentially mounted at each end and in the middle of the helical drum 12, surrounding the bracing members 20, to provide additional strength and rigidity to the structure and to provide a suitable surface upon which to support and drive the drum for rotation. The helical drum is supported on the support frame 14 by the end bands 22a, 22b riding on the periphery of the sealed bearings 24. The sealed bearings have a flange 26 at their outer edges to engage the confronting edge of the corresponding band and to prevent the helical drum 12 from becoming disengaged from the bearings An electric drive motor 28 mounted on the support frame 14 drives a belt 30 which engages the center band 22c to rotatably drive the helical drum. Two wire rods 32 are welded around the circumference of the center band 22c at its outer edges, forming flanges which prevent the drive belt 30 from becoming laterally disengaged from the center band 22c. Idler pulley 34 mounted on the end of a spring loaded arm 36 mounted to the frame 14 provides constant tension on the drive belt 30.

A conventional conveyor 40 known in the art is disposed at the entry end 42 of the helical drum 12 to convey berries to the dryer A chute 44 is disposed underneath the delivery end of the conveyor 40 to receive the berries 41 and guide them into the interior of the drum 12. At the opposite or exit end 46 of the drum, another chute 48 is disposed to receive the berries and carry them away from the dryer.

The fan 16 is a conventional squirrel-cage type electric fan well known in the art. To provide adjustment of the fan's position for optimum airflow, preferably radiating downwardly toward the bottom of the helical drum 12 and the berries thereon, the fan is mounted to one end of a first horizontal arm 50, which runs substantially parallel to the longitudinal axis of the drum 12. The other end of the horizontal arm 50 is slidably received in a clamp 52 mounted to one end of a second horizontal arm 54 substantially perpendicular to the first horizontal arm 50. The other end of the second horizontal arm is slidably received in a clamp 56, which is mounted to the upper end of a vertical arm 58. The lower end of the vertical arm 58 is slidably received in a clamp 60 mounted to the frame 14. Thus, the position of the fan can be adjusted in all three dimensions by releasing the clamps and adjusting the various arms to their desired position, then retightening the clamps. It will be understood that a plurality of fans 16 may be provided, if desired.

To provide for control over the speed of the fan 16 and the rotational speed of the drum 12, conventional continuously adjustable rheostatic electric controls are used.

To use the berry dryer of the present invention, the berries are carried along by the conveyor 40 and discharged down the entry chute 44 and introduced into the entry end 42 of the drum 12. The spaces between adjacent turns 18 of the helical drum being smaller than the berries 41, the berries are supported on and between the turns of the helix. As the electric motor 28 drives the belt 30, the belt engages the center band 22c of the drum. Circumferential rods 32 on either edge of the center band keep the belt from becoming laterally disengaged from the center band, and idler pulley 34 maintains constant tension on the drive belt. The drum 12 is supported for rotation on the sealed bearings 24 mounted on the frame 14, and flanges 26 on the outer ends of the bearings 24 keep the end bands 22a, 22b from becoming disengaged from the bearings. As the drum rotates, the turns of the helix move the berries down the interior of the drum, rotating the berries slowly as they go.

The fan is located as desired by positioning the fan support arms 50, 54, and 58 by adjusting their mounting clamps 52, 56, and 60. The speed of rotation of the drum 12 and the speed of the fan 16 are adjusted by setting the rheostatic controls (not shown). Thus, depending upon the fragility of the fruit being dried, the ambient conditions, and the amount of moisture on the fruit, the drum can tumble the berries quickly through a strong current of air or move delicate fruits slowly through a gentle stream of air. The air flow evaporates moisture to the outside of the drum through the spaces between the turns of the drum 12, and as the berries dry, dirt, debris, and stems which had been stuck to the berries is removed from the fruit by the tumbling motion and the moving airstream. Such debris is carried by gravity and the airstream through the spaces between the coils and out of the drum. Thus, the debris is carried away from the berries, rather than being retained inside the drum to recontaminate the fruit. The unimpeded open space between adjacent coils of the helical drum 12 promotes the flow of air, evaporated moisture from the berries, and debris from the interior of the drum.

As the helix carries the fruit to the exit end 46 of the drum 12, the berries roll gently down the exit chute 48, where they are packaged or otherwise processed.

Finally, it will be understood that the preferred embodiment of the present invention has been disclosed by way of example, and that other modifications may occur to those skilled in the art without departing from the scope and spirit of the appended claims.

What is claimed is:

1. An apparatus for drying berries and the like, comprising:

a helical drum having an interior for supporting the berries, the drum comprising a continuous helix each turn of which is in parallel spaced apart relation to the adjacent turns, the spacing between adjacent turns of the helix being substantially constant and being smaller than the diameter of the berries;

means for supporting said helical drum for rotation about the longitudinal axis of said helical drum; and means disposed inside said helical drum for generating a flow of air outwardly through the spaces between the turns of said helical drum;

whereby berries which are placed inside said drum are supported on and between the turns of said helical drum and are carried along the length of said drum by the rotation of said helical drum while being subjected to a drying current of air, so that moisture and debris from the berries passes through the open spaces between adjacent turns of the helix supporting the berries.

2. The berry drying apparatus of claim 1, wherein said continuous helix comprises a continuous helical strand of coiled wire, each coil of which is in parallel, spaced apart relation to the adjacent coils, the spacing between adjacent coils of the wire being substantially constant and being smaller than the diameter of the berries; and further comprising a plurality of bracing members extending longitudinally of the coiled wire at spaced apart locations around the outer circumference thereof and attached to each coil of the wire to retain said coils in parallel spaced apart relation, said bracing members all being disposed exteriorly of the drum such that no bracing members are mounted within the drum to obstruct or impact the berries during their travel along the length of the drum as the drum is rotated.

3. The berry drying apparatus of claim 2, further comprising a plurality of circumferential bands attached to the outer surface of said longitudinal bracing members to provide additional strength and rigidity to the drum and to provide means for supporting and driving said drum for rotation.

4. The berry drying apparatus of claim 3, wherein said means for supporting said helical drum for rotation about its longitudinal axis further comprises a frame having a plurality of rollers mounted to rotate about a longitudinal axis parallel to the longitudinal axis of said drum, and disposed to engage the confronting edges of said circumferential bands to support said drum for rotation.

5. The berry drying apparatus of claim 4, wherein said rollers include circumferential flanges disposed to prevent said drum from becoming longitudinally disengaged from said rollers.

6. The berry drying apparatus of claim 1, further comprising motor means for driving said drum for rotation about its longitudinal axis.

7. The berry drying apparatus of claim 3, further comprising:
a motor mounted on said support means and having a drive shaft with a pulley attached to the end thereof; and
a drive belt engaging said pulley and one of said circumferential bands,
whereby said motor drives said drum for rotation about its longitudinal axis.

8. An apparatus for drying berries and the like, comprising:
a drum comprising a continuous helix each turn of which is in parallel spaced apart relation to the adjacent turns, the spacing between adjacent turns of said helix being substantially constant and being smaller than the diameter of the berries such that said berries are supported interiorly of said drum on and between the turns of said helical drum;
means for supporting said helical drum for rotation about its longitudinal axis, whereby berries which are placed inside said helical drum are carried along the length of said drum by the rotation of said helix;
a plurality of bracing members extending longitudinally of said helical drum at spaced apart locations around the outer circumference thereof and attached to the turns of said helix to retain said turns in parallel, substantially constantly spaced apart relation, all said bracing members being disposed exteriorly of said helical drum such that no bracing members are mounted within the drum to obstuct or impact the berries during their travel along the length of said drum as the drum is rotated; and
means disposed inside said helical drum for generating a flow of air outwardly through the spaces between the turns of said helical drum for subjecting the berries to a drying current of air such that moisture and debris from the berries passes through the open spaces between adjacent turns of the helical drum supporting the berries.

* * * * *